United States Patent [19]
Ruggles et al.

[11] Patent Number: 5,472,243
[45] Date of Patent: Dec. 5, 1995

[54] FLUTED TUBE JOINT

[75] Inventors: Peter C. Ruggles; Jack S. Snodgrass, both of Richmond, Va.

[73] Assignee: Reynolds Metals Company, Richmond, Va.

[21] Appl. No.: 245,193

[22] Filed: May 17, 1994

[51] Int. Cl.$^6$ ............................. F16L 13/10; F16L 13/14
[52] U.S. Cl. ..................... 285/222; 285/382; 285/382.4; 403/277; 403/282; 29/890.044; 29/469.5; 29/523; 156/294; 156/295
[58] Field of Search ..................... 156/293, 294, 156/295, 329, 330; 165/173, 178; 29/890.043, 890.044, 469.5, 523; 285/202, 222, 382, 382.4; 403/277, 279, 282

[56] References Cited

U.S. PATENT DOCUMENTS

| | | |
|---|---|---|
| 1,164,739 | 12/1915 | Mershon . |
| 1,742,625 | 1/1930 | Weckerle . |
| 2,040,126 | 5/1936 | Grieve . |
| 2,751,237 | 6/1956 | Conley . |
| 3,062,940 | 11/1962 | Bauer et al. . |
| 3,098,698 | 7/1963 | Glynn . |
| 3,290,199 | 12/1966 | Willhoite . |
| 3,471,178 | 10/1969 | Roe ................................. 29/890.043 |
| 3,575,366 | 4/1971 | Blum et al. . |
| 3,592,717 | 7/1971 | Gaughran . |
| 3,737,355 | 6/1973 | Epstein et al. . |
| 3,784,435 | 1/1974 | Bagheri et al. . |
| 4,081,891 | 4/1978 | Morrison . |
| 4,328,983 | 5/1982 | Gibson ................................. 285/382 |
| 4,398,754 | 8/1983 | Caroleo et al. . |
| 4,527,820 | 7/1985 | Gibson ................................. 285/382.2 |
| 5,351,847 | 10/1994 | Greenbaum ............................. 220/401 |

FOREIGN PATENT DOCUMENTS

| | | | |
|---|---|---|---|
| 1288648 | 9/1972 | United Kingdom .................. | 156/294 |

*Primary Examiner*—Michael W. Ball
*Assistant Examiner*—Sam Chuan Yao
*Attorney, Agent, or Firm*—Alan M. Biddison

[57] ABSTRACT

A method of forming a tube joint which can be used in a desalination plant includes providing a fluted tube, applying a sealant to the tube end and inserting the tube end into a tube sheet or plate to form a joint therebetween. After insertion, the inner surface of the fluted tube is worked to deform external ridges of the fluted tube and uniformly distribute the sealant throughout the joint area. The fluted tube is deformed using a roll expanding method. The fluted design of the tube retains sealant in the joint area during tube insertion and expansion and takes advantage of the heat transfer characteristic of the flutes to provide an improved joint construction especially adapted for heat exchange use.

9 Claims, 2 Drawing Sheets

FLUTED TUBE JOINT

FIELD OF THE INVENTION

The present invention is directed to a method of joining fluted tubes and, in particular, to a joint construction utilizing a fluted tube, a sealant and a roll expanding treatment to produce a joint resistant to leakage and corrosion.

BACKGROUND ART

It is well known that desalination plants present a corrosive environment due to the presence of concentrated brine and elevated operating temperatures. This corrosive environment can be detrimental to many of the materials used in these types of plants which would adversely affect plant operations by requiring excessive plant maintenance and repair.

The joints of the heat exchangers in these desalination plants are especially susceptible to corrosion. That is, if the tube joint is not fully sealed, the concentrated brine solution can seep into the resultant crevices and cause excessive corrosion, especially on the relatively thin wall tube.

Presently, heat exchanger tube joints are often manufactured using smooth surfaced tubes and roll expansion. A leak free joint usually results from expansion of smooth O.D. tube into a smooth walled hole in a tube sheet. Although fluted tubes provide beneficial heat transfer characteristics, fluted ended tubes have not been used in these types of applications in part because a pressure tight, corrosion resistant joint has not been designed using fluted tube.

In view of the disadvantages associated with adapting smooth tube joining technology to fluted tubes, a need has developed to provide an improved joint structure which provides an adequate seal between the fluted tube end and the tube receiving opening while maintaining the ability to use a grooved or fluted tube design.

In response to this need, the present invention provides a tube joint construction which provides a leakproof seal and minimizes corrosion at the joint area and is adapted for heat exchanger use, in particular, desalination plant heat exchangers.

SUMMARY OF THE INVENTION

It is a first object of the present invention to provide an improved tube bundle construction which assures leakproof operation and minimizes the tendency for corrosion at the joint area.

It is another object of the present invention to provide a method of forming a tube joint using a fluted tube design which contributes to a uniform distribution of sealant in the joint area to assure a void free, leakproof joint design.

Another object of the present invention is to provide a method for tube joint manufacture which includes deforming a fluted tube to both increase the joint mechanical strength and uniformly distribute sealant to assure a leakproof, corrosion resistant joint.

It is a still further object of the present invention to provide a tube joint that is especially adaptable for heat exchanger use and has a fluted tube design which minimizes sealant loss or removal during joint manufacture.

Other objects and advantages of the present invention will become apparent as a description thereof proceeds.

In satisfaction of the foregoing objects and advantages, the present invention provides a method of joining a tube to an opening in a tube receiving member comprising the first step of providing the tube with a fluted or grooved outer surface on at least an end thereof comprising a plurality of ridges and valleys. Subsequently, a sealant such as a silicone or an epoxy is applied to an end of the fluted tube. The sealant-containing tube end is inserted into the opening of the tube receiving member, and the fluted tube is worked to form a joint between the tube end and the tube receiving member, distributing the sealant uniformly throughout the joint.

Preferably, the sealant is distributed by cold working, applying force to the inner surfaces of the fluted tube in the joint area to deform the external ridges of the fluted surface against the surface of the opening in the tube receiving member to increase mechanical strength and uniformly distribute sealant in the fluted surface valleys.

Another aspect of the invention includes a joint construction comprising a tube having on at least one end thereof, a fluted surface comprising a plurality of ridges and valleys. The tube end is secured in the opening of a tube receiving member having a sealant uniformly distributed between the fluted surface of the tube and the surface of the opening in the tube receiving member. The ridges of the fluted surface include a deformed portion thereof resulting from compressive forces applied thereto. The inventive joint construction is void free as a result of the metal to metal contact between the fluted surface of the tube and the surface of the tube receiving opening and the uniform distribution of the sealant in the spaces between the fluted surface and the surface of the tube receiving opening.

Alternatively, the surface of the opening in the tube receiving member can include the ridges and valleys thereon as part of the joint construction.

BRIEF DESCRIPTION OF THE DRAWINGS

Reference is now made to the drawings wherein.

DESCRIPTION OF THE PREFERRED EMBODIMENTS

The present invention provides a method and joint construction offering improvements over prior art smooth tube joint designs. By the invention, a joint is made which provides a tight and leakproof seal to prevent or minimize the tendency for corrosion of joints used in corrosive environments, such as desalination plants. The inventive joint construction fully seals the joint area with a sealant, thereby eliminating voids and possible sites for corrosion. The inventive joint construction permits the use of a tube having a fluted, grooved, or enhanced surface end. The terms "grooves", "flutes", "contoured" and "enhanced surface" may be used interchangeably hereinafter and are not intended to limit the use of the invention to a particular surface contour. The tube is especially useful for heat exchanger use such as in a desalination plant tube bundle or an ocean thermal energy conversion system which combines a high surface area heat exchange component with a fluid tight and corrosion resistant joint.

According to the invention, sealant is applied to the contoured or fluted end of a tube and then the end is inserted into a tube receiving member. Wiping or removal of sealant from the end either does not have a deleterious effect or is minimal when the tube is inserted into the tube receiving opening because the recesses or valleys in the end provide reservoirs for holding the sealant. By this design, sufficient sealant remains in the joint area and it can then be uniformly distributed by working or deforming the tube end to assure a leakproof design. Working, for example, roll expansion, further distributes sealant in the joint area to eliminate voids and enhances the joint mechanical strength.

Figure 1:
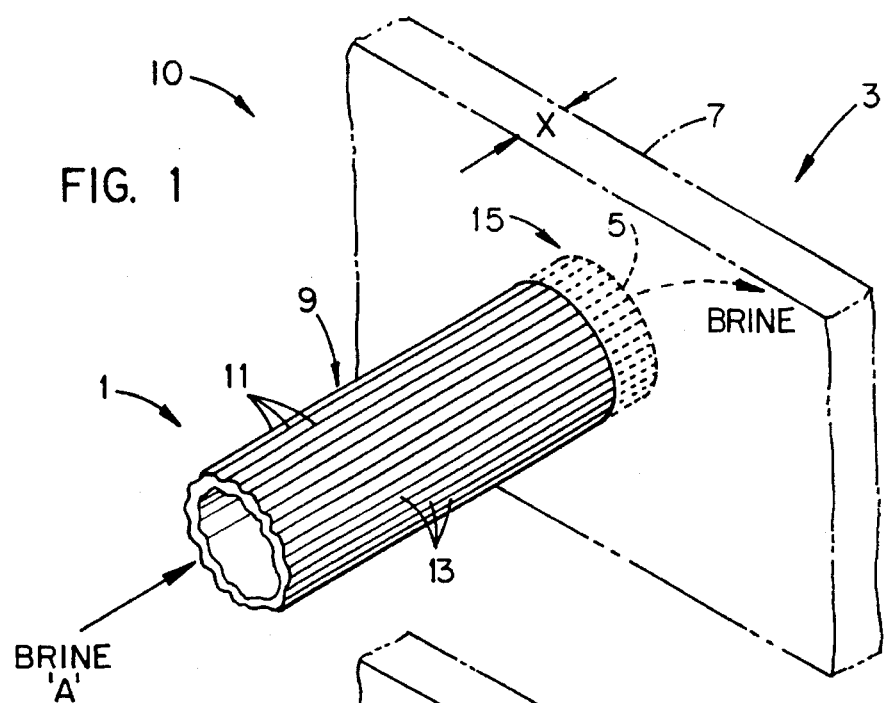
FIG. 1 is a perspective view of an exemplary joint construction according to the invention.

With reference now to FIG. 1, the joint construction of the present invention, depicted in an exemplary desalination plant use, is generally designated by the reference numeral 10 and is seen to include a fluted tube 1 and a tube receiving member 3. Typically, the tube receiving member 3 is in the form of a plate of a given thickness "X".

In a desalination plant, the tube receiving member 3 is typically referred to as a tube sheet and acts as a receptacle for one or more of the fluted tubes 1. In actual use, a number of tubes 1 are vertically arranged between opposing horizontally-oriented tube receiving members 3. Typically, brine enters and flows through the fluted tube 1 and exits the tube end face 5 which is coincident with the rear face 7 of the tube receiving member 3. The brine can then pass through another series of fluted tubes as part of the desalination process.

Figure 3:
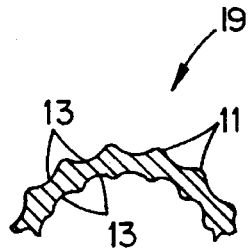
FIG. 3 is a partial cross-sectional view of the fluted tube of FIG. 2.

The tube 1 comprises a plurality of flutes 9 which comprise a series of ridges 11 and valleys 13, see also FIG. 3. The fluted tube 1 is preferably an extruded aluminum or aluminum alloy. Generally, the ridges 11 and valleys 13 are aligned in a parallel fashion which eases the manufacturing of the fluted tube 1, especially if the tube 1 is extruded. However, non-parallel grooves can also be utilized.

As will be described hereinafter, the tube 1 is inserted into an opening of the tube receiving member 3 to form a joint construction 15.

Figure 2:
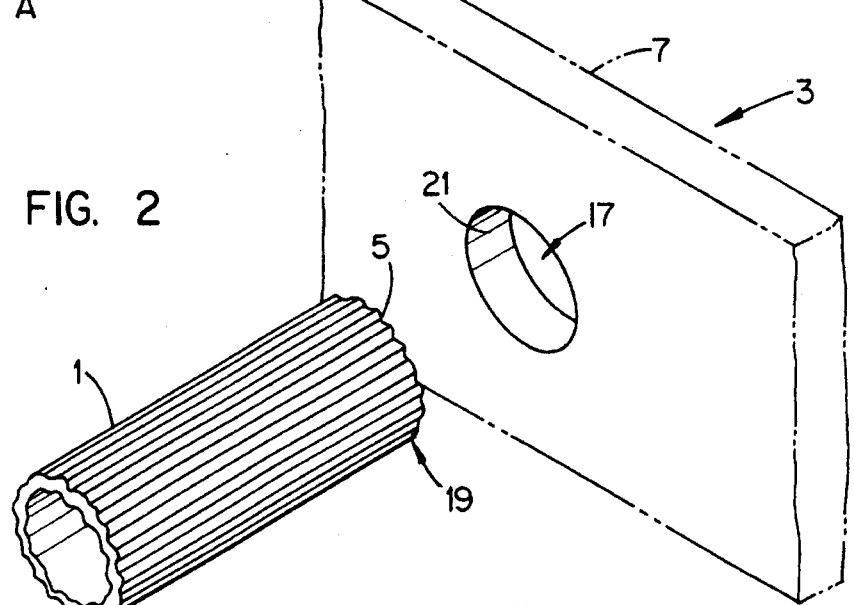
FIG. 2 is a perspective view similar to FIG. 1 showing the fluted tube and tube receiving member separated.

With reference to FIG. 2, the tube receiving member 3 has a cylindrical opening 17 sized to receive the tube end 19 of the tube 1. The cylindrical opening 17 includes a generally smooth surface 21.

In forming the joint 15, the tube end 19 is inserted into the cylindrical opening 17. The end face 5 can be flush with the rear surface 7 of the tube receiving member 3 or alternatively can extend beyond or be recessed therefrom. As will be described in further detail hereinafter, a sealant is applied to the tube end 19 prior to insertion into the cylindrical opening 17 to seal the joint 15.

With reference to FIG. 3, the enlarged partial cross-sectional view of the tube 1 shows the ridges 11 and valleys 13. During sealant application to the tube end 19, the sealant is distributed in the valleys 13 and along the ridges 11.

Figure 4:
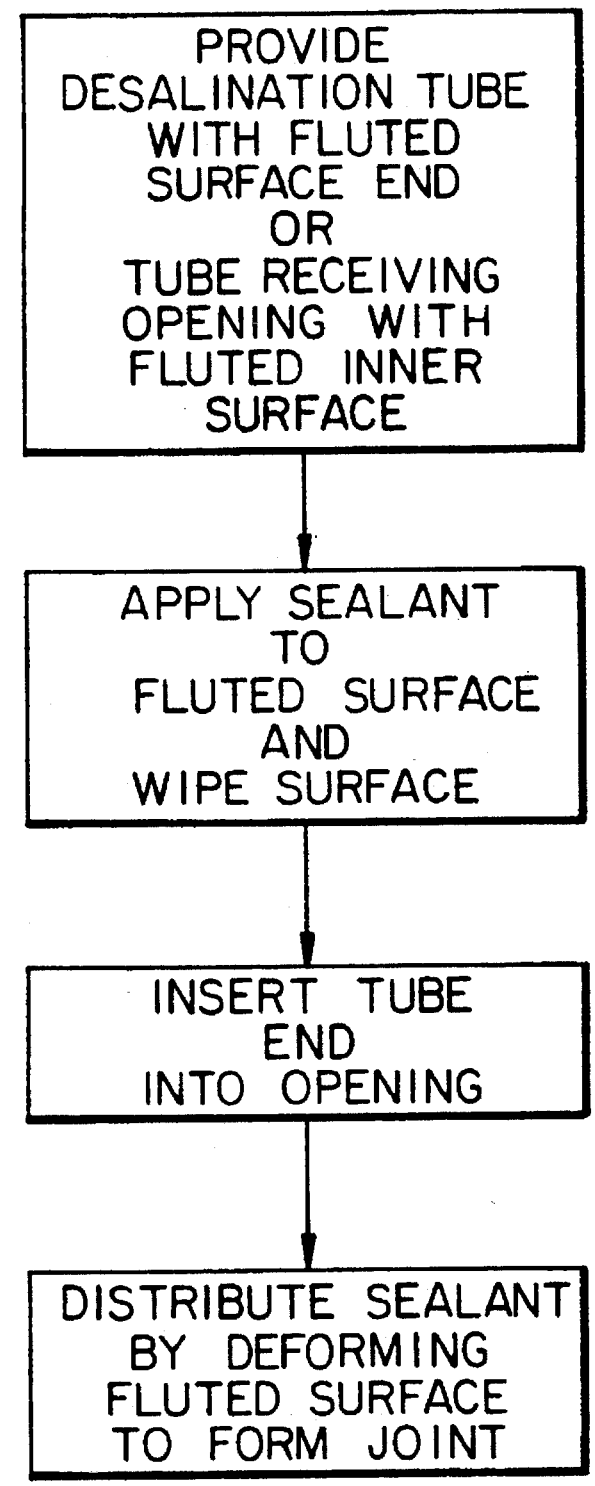
FIG. 4 is a schematic diagram of the inventive method of manufacturing the joint.

With reference now to FIG. 4, the first step in forming the joint construction according to the invention includes providing at least an end of a tube with a grooved or fluted surface such as parallel ridges and valleys or flutes thereon, or, alternatively, forming a fluted or grooved surface in the tube receiving opening 17. As shown in FIGS. 1–3, the tube can be in the form of a doubly fluted extruded design. However, any grooved surface having ridges and valleys on at least the outside of the tube end 19 and preferably along the entire tube length can be used.

Figure 5:
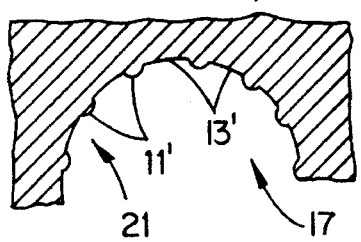
FIG. 5 is a partial cross-sectional view of the tube receiving member of FIG. 2 in an alternative embodiment of the invention.

Alternatively, with reference to FIG. 5, the surface 21 of the tube receiving opening 17 can include a grooved surface in the form of ridges 11' and valleys 13'. The ridges and valleys 11' and 13' may be formed in any conventional fashion such as grinding, machining or other types of metal working or removal steps.

With reference to FIG. 4 again, after a fluted surface is provided, either on the tube end or the surface of the tube receiving opening, a sealant is applied to the tube end fluted surface. Preferably, the sealant is a silicone. However, other sealants, such as an epoxy or the like, could also be used. In fact, any known sealant capable of providing a leak-proof joint between the tube and tube receiving member is applicable to the inventive method and joint construction. Preferably, the sealant is applied to the tube end 19 such that when the tube is inserted into the tube sheet, the sealant is about 1/8 inch from the faces 6,7 of the tube sheet. The step of sealant application can be performed manually or automatically in any known fashion.

Once the sealant is applied to the fluted surface, the tube end is preferably wiped to distribute the sealant in the valleys and remove excess sealant. The end is then inserted into the opening with the end face of the tube preferably aligned with the plane coincident with the face 7 of the tube receiving member 3, see FIGS. 1 and 2.

When the tube is inserted into the opening according to the invention, the applied sealant remains on the fluted surface as a result of the valleys formed therein. The sealant is retained in the valleys and is not significantly effected by any wiping action that may occur between the tube surface and the surface 21 of the tube receiving opening during insertion.

Once the tube is inserted into the opening, the sealant is uniformly distributed through deformation of the fluted surface to form the joint construction. During this distribution step, sealant extrudes out the front and back side of the joint, forming small fillets of sealant in each of the valleys of the fluted surface at the intersection of the tube and planar surfaces 6,7 of the tube receiving member. When the sealant extrudes out the joint area into fillets, the roll expansion is generally complete since all voids in the joint area have been eliminated. This extrusion of sealant ensures that the valleys are fully filled to provide a leak free crevice free joint.

Any known working step can be utilized to deform the fluted surface to achieve the uniform distribution of the sealant throughout the joint as described above. In a preferred embodiment, a roll expansion process is utilized. That is, a plurality of rollers mounted on a tapered mandrel are inserted into the tube at the joint area 15, see FIG. 1. During rolling, the rollers contact the inner surface of the tube end and cold work or deform the tube radially, such deformation also deforming at least the external ridges of the fluted surface of the tube. Alternatively, in a less preferred embodiment, the end of the tube is smooth and the tube receiving member has a grooved surface that is deformed to make the joint. As the mandrel of the roll expander is further inserted into the joint, the rollers expand to continually apply a working force to the tube material. The roll expansion can be performed using any known roll expanding tool including an Elliott Model 3320 heavy duty tube expander.

Figure 6:
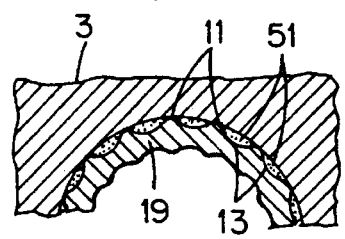
FIG. 6 is a partial cross-sectional view of the joint construction depicted in FIG. 1.

With reference to FIG. 6, a partial cross-sectional view of a finished joint construction is generally designated by the reference numeral 50 and is seen to include the tube end 19 and tube receiving member 3. The ridges 11 of the tube end 19 are deformed as a result of the roll expansion. By this deformation, sealant 51 fills the valleys 13 and eliminates any voids therein to ensure a leak free joint construction. In addition, deformation of the ridges 11 also increases the mechanical strength of the joint as a result of the cold work applied to the tube material. In the joint construction 50, the sealant contained in the valleys 13 acts as a gasket and provides long term durability to the joint construction. Moreover, since the sealant primarily resides in the valleys 13, no stress is applied thereto, further contributing to an enhanced joint construction.

As stated above, a preferential configuration for the tube end 19 is a fluted design as shown in FIG. 1. In a preferred embodiment, the tubes 1 are doubly fluted along their entire length. However, the ridges and valleys described above can be only on the tube end for joint construction. Further, any configuration which provides a plurality of ridges and valleys either in the tube receiving opening or at least on the end of the tube will provide the joint construction of the invention.

With reference again to FIGS. 1 and 2, although a single tube 1 is shown joined to the tube receiving member 3, the tube receiving member 3 can include a plurality of openings 17 therein to receive a plurality of tubes. The tubes 1 can then be connected to a tube sheet 3 at respective tube ends. When using opposing tube sheets 3, each tube 1 is fully inserted through one of the tube sheets such that opposing ends of the tube align in their respective tube sheet openings. Once the tubes are inserted, each joint can be constructed as described above. Likewise, the tube receiving member 3 may be in other forms to provide the inventive joint construction, including couplings connecting at least a pair of tubes together or a structure having internal passageways therethrough for fluid flow.

Preferably, the surfaces of the tube end 19 can be etched or treated to remove impurities such as oxides prior to joint construction. In addition, the tube receiving member forming the joint can be similarly treated. Any known conventional treatments can be used for this process step. Cleaning the joint surfaces enhances joint durability.

As such, an invention has been disclosed in terms of preferred embodiments thereof which fulfill each and every one of the objects of the present invention as set forth hereinabove and provide a new and improved joint construction and method of making.

Of course, various changes, modifications and alterations from the teachings of the present invention may be contemplated by those skilled in the art without departing from the intended spirit and scope thereof. Accordingly, it is intended that the present invention only be limited by the terms of the appended claims.

What is claimed is:

1. A joint construction comprising:
    a) a tube;
    b) a tube receiving member having an opening sized to receive an end of said tube;
    c) a grooved surface comprising a plurality of ridges and valleys formed in internal and exterior surfaces of said tube; and
    d) a sealant;
    e) wherein said tube end engages said opening, said sealant is substantially evenly distributed in the valleys of the exterior surface of said tube end and at least a portion of said ridges on the interior and exterior surfaces of said tube comprise deformed structures resulting from compressive forces applied thereto.

2. The joint construction of claim 1 wherein said sealant is selected from the group of silicone and an epoxy.

3. The joint construction of claim 1 wherein said tube receiving member is a plate.

4. The point construction of claim 1 wherein said grooved surface extends the entire length of said tube.

5. The joint construction of claim 1 wherein said tube is an aluminum fluted extrusion, flutes of said extrusion providing said plurality of ridges and valleys.

6. A joint construction comprising:
    a) a tube;
    b) a tube receiving member having an opening sized to receive an end of said tube;
    c) a grooved surface comprising a plurality of ridges and valleys formed in an exterior surface of the end of said tube; and
    d) a sealant;
    e) wherein said tube end engages said opening, said sealant is substantially evenly distributed in the valleys of said tube end and at least a portion of said ridges on the exterior surface of said tube comprise deformed structures resulting from compressive forces applied thereto and the internal diameter of the tube end is enlarged.

7. The joint construction of claim 6, wherein a plurality of ridges and valleys are formed in an internal surface of said tube.

8. The joint construction of claim 6, wherein the plurality of ridges and valleys extend the entire length of said tube.

9. The joint construction of claim 7, wherein the plurality of ridges and valleys extend the entire length of said tube.

\* \* \* \* \*